Patented Oct. 12, 1937

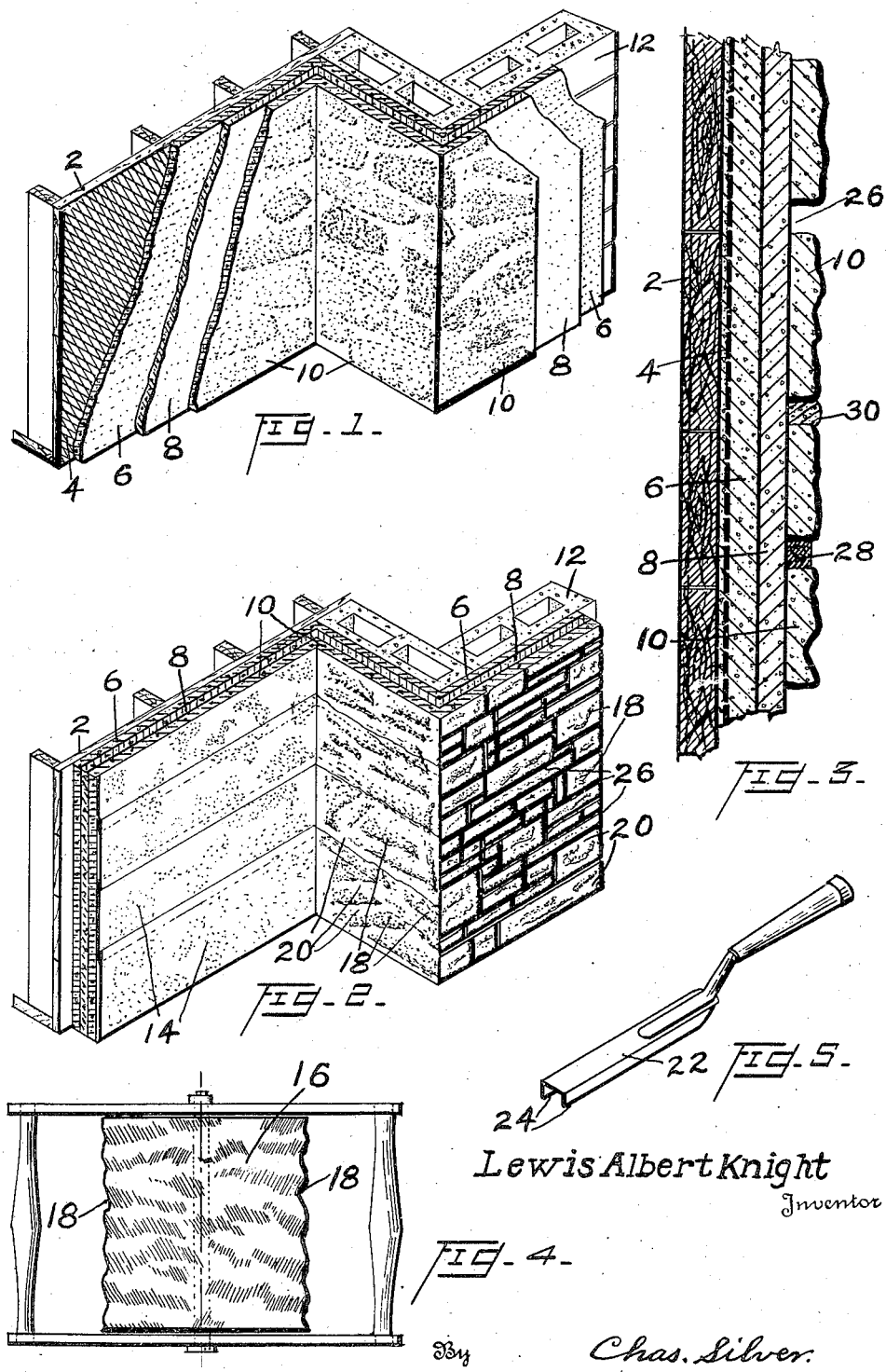

2,095,641

UNITED STATES PATENT OFFICE 2,095,641

PROCESS OF MAKING ARTIFICIAL STONE WALL FACINGS

Lewis Albert Knight, Owings Mills, Md., assignor to The Lasting Products Co., Baltimore, Md., a corporation of Maryland Application March 1, 1937, Serial No. 128,504

8 Claims. (Cl. 72—17)

This invention relates to artificial stone wall facings and finishes and process of making same and has particular reference to polychrome wall facings and finishes of this character.

There has been a long felt need in this art for wall facings, adapted for use on base structures of wood, metal, brick, cement, concrete block, cinder block, stone, etc. that will resemble as much as possible the natural stone facings and finishes and also possess to as great or greater extent the durability and wearing qualities of natural stone facings.

Many efforts to solve this problem have heretofore been attempted but the results have been attended by distinctive disadvantages.

In one of these prior processes, plastic material is applied to a wall from specially designed molds. Each mold is provided with a plunger whereby the material is forced out of the mold and pressed against the wall. The surface of the plunger is corrugated or crinkled to produce the corresponding design on the finished surface. Before filling the mold with the plastic material the face of the plunger is covered with waxed paper to prevent adhesion of the plastic material to the plunger. For each different design and size of stone to be formed on the wall a different mold must be used, thus involving considerable cost and necessitating a large stock of molds to produce the desired variety of artificial stone facings. To provide the proper chromatic effects, pigments of the desired shade and color are sprinkled on the waxed paper within the mold before the plastic material is poured in. This results in an extremely superficial tinting of the facing, which readily wears away or becomes discolored through the action of the atmospheric elements.

A still further disadvantage of this prior process is that when artificial stone facings of large area are to be formed on the walls the mold and the contents of plastic material assume great weight and the process becomes laborious. Pressure must also be exerted in the application of the material to the walls, thus adding further to the labors of the operation. It has also been found that, in the final construction, contact between the facing and the wall cannot be assured for the entire extent of the wall treated, and there is also much uncertainty as to the location and extent of any contact that is produced. As a consequence, objectionable air pockets of undesirable extent exist in the final structure, resulting in a great weakening of the bond between wall and facing and rendering the wall facing very susceptible to easy destruction through breaking, scaling or chipping.

A still further objection to this process is that it requires specially trained labor to produce a finished piece of work of satisfactory and proper appearance. The tools employed for this process and the mode of operation are entirely foreign to the very simple tools and the mode of operation of masons and cement finishers, which necessitates the training of specially skilled labor. The proper positioning of each of the masses of plastic material forced from the mold onto the wall to effect proper alinement with each other of the individual sections of varying size and shape requires much skill and practice and therefore involves additional items of expense.

Also, the plunger does not readily separate from the mass of plastic material after its application to the wall and it is difficult to prevent disturbance of the plastic material on the wall during such removal of the plunger. Such disturbance results in marring the outward configuration of the facing and also produces checks, cracks and fissures in the plastic material, all of which weaken and mar the final wall facing.

Among the objects of this invention is to provide a wall facing that will be free from the objections heretofore described to the wall facings produced by the particular prior process outlined heretofore, and to provide a process whereby the objections and disadvantages of the prior process heretofore set forth are eliminated.

A further object of this invention is to provide a process for making an artificial stone facing that may be readily carried out by masons and cement finishers and wherein the tools used by masons and cement finishers are utilized.

A still further object of this invention is to provide a process for making an artificial stone facing which can be employed for walls of various design and construction, including rounded structures as well as straight-faced walls.

Other, further and more specific objects of this invention will become readily apparent to persons skilled in the art from a consideration of the following description when taken in conjunction with the accompanying drawing wherein:

Figs. 1 and 2 are fragmentary perspective views showing several layers of coating material applied to walls of wood, and masonry. In Fig. 1, the facings are shown in unfinished form. In Fig. 2, the facings during three stages of the process are shown.

Fig. 3 is a fragmental cross-section through a wall showing the several layers of plastic material applied to a wall.

Fig. 4 is a side view of a specially designed roller used in my process.

Fig. 5 is a perspective view of the chasing tool used in my process.

Upon a wall 2 of wood, a lath 4 of wood or metal and preferably reticulated or perforated is attached to the wall. A layer 6 of plastic material, such as cement mortar, is applied over the lath and the surface of this layer is scored before it sets and dries. The lath 4 serves to reinforce the layer 6 and aid its adherence to the wall 2. After the layer 6 dries, another layer of plastic material 8 is applied thereon, and while the second layer 8 is in plastic condition the finishing coating 10 of plastic material is applied on this layer 8.

This finishing coating 10 is formed of two or more differently colored and/or differently shaded mortar cements. The differently colored and differently shaded mortars are distributed to produce the chromatic effects desired. The layers of plastic material 6, 8 and 10 are applied with a trowel. The layer 6 is preferably from ⅜ to ¾ inch thick, the layers 8 and 10 are preferably from ¼ to ⅜ inch thick.

Where the base or wall is of masonry no metal or other lath is needed, the first coating 6 being applied directly to the masonry 12, and the other coatings 8 and 10 are applied as heretofore described for wooden bases or walls.

Before the plastic material in the coatings 8 and 10 has become set, waxed paper 14 or other lamina which does not adhere to the plastic material is spread thereon, after which the roller 16 having the crinkled surface 17 is passed over the waxed paper in the directions desired and with sufficient pressure to produce the crinkled surface on the facing 10. After the roller has passed over the waxed paper attached to the plastic coating 10 there will be formed on this coating elevations 18 and depressions 20 corresponding to the part of the roller in contact with the facing during the rolling process and resembling the variegated crinkled surfaces of undressed stone.

The waxed paper is then removed and the crinkled surface is afterward scored with guide lines for the chasing tool 22, which has two parallel cutting edges 24 and is used to form the grooves or furrows 26 in simulation of the mortar joints in natural stone structures and thereby producing in the finishing coating 10 blocks of various stone-like sizes. The distance between the cutting edges 24 of the tool 22 is equal to the width of the ordinary mortar joints.

I have found it very satisfactory to have this furrow or groove of a depth approximating the thickness of the finishing coating 10, in which case the outer layer 10 is gouged until the layer 8 is exposed at these grooves.

These grooves 26 may be left in the unfinished state or else smoothed. If desired, the grooves may be filled with mortar 28 of any desired color or shade. This mortar may be formed with a bead 30, as shown in Fig. 3, or fashioned into any other form.

The facings produced by my novel process possess a very attractive appearance, effectively simulating that of unfinished or undressed natural stone. Since the mortar cements used for yielding the polychrome effects have the pigment incorporated throughout the masses and since these colored mortar cements are of substantial depth, the color extends a substantial distance below the surface of the facing.

In addition to the variegated crinkled surfaces produced on the facing, the roller also blends the cementitious materials of different colors and thereby enhances the appearance of the facings.

The plastic mortar cement may be made of the various kinds of cementitious mixtures, such as Portland cement, hydraulic cement, quick or slow setting cements, plaster, etc.

The roller for producing the crinkled surface on the facing is preferably made of cast aluminum. If desired, several rollers of different contours and/or different sizes may be employed to admit the production of a greater variety of designs on the crinkled surface blocks or sections and also to permit operation in corners of walls and other restricted zones. My process is adapted for use on curved and other irregular base structures as well as flat bases or walls, and in this respect possesses a very valuable advance over the prior processes which have been found very difficult to operate on anything other than flat walls.

A modification of my process consists in dashing upon the outer plastic cementitious material variously colored powdered material such as mica, oxide pigments, stone dust, slate dust or chips of mineral or artificial stone, diatomaceous earth, kieselguhr, volcanic scoria, etc., before applying the waxed paper thereto. This produces a speckled surface on the artificial stone finish, in simulation of special natural rocks or stones.

If it is desired to apply to the facing 10 other substances which react chemically therewith, such application is preferably made before the crinkling step of the process.

The advantages of my process over the methods heretofore employed are as follows:

1. The need for a large number of molds, heretofore employed to simulate the various surface irregularities of natural undressed stone, is overcome.

2. A much greater area of surfacing can be accomplished with a given amount of labor in a given amount of time.

3. A firmer and better bond between the several coatings and particularly between the second coating and the outer coating is obtained with the troweling operations of my process than in the prior process where there is either poor contact or no contact at all over extensive areas between the outer facing and its support.

4. By my process there is assured a sufficient depth of colored material so that it will withstand, for long periods of time, erosion and other wear of the atmospheric elements without losing its characteristic colored appearance.

5. With my process there is no need for using pressure when applying the outer surface. Merely smearing the plastic material with a trowel has been found satisfactory and there is formed a surface that is continuous and free from cracks, breaks and other undesirable voids incident to prior constructions of this type.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making an artificial stone facing, applying to a supporting base a layer of cementitious material in plastic form, then applying upon said layer at predetermined zones other cementitious material in plastic form and of a plurality of colors, covering the outer plastic material with a lamina of material to which the plastic material does not adhere, passing a tool over said lamina and producing in the outer plastic cementitious materials elevations and depressions resembling those of undressed stone, removing the non-adhering lamina and then forming in said outer plastic cementitious materials furrows or grooves of design and configuration in simulation of mortar joints on the surfaces of stone structures.

2. In a process of making an artificial stone facing, applying to a supporting base a layer of cementitious material in plastic form, then applying upon said layer at predetermined zones other cementitious material in plastic form and of a plurality of colors, covering the outer plastic material with thin waterproof paper, passing a roller with a crinkled surface over said paper and producing in the outer plastic cementitious materials elevations and depressions resembling those of undressed stone, removing the waterproof paper and then forming in said outer plastic cementitious materials furrows or grooves of design and configuration in simulation of mortar joints on the surfaces of stone structures.

3. In a process of making an artificial stone facing, applying to a supporting base a layer of cementitious material in plastic form, then applying upon said layer at predetermined zones other cementitious material in plastic form and of a plurality of colors, applying colored, comminuted material upon the outer plastic material, covering the latter with a lamina of material to which the plastic material does not adhere, passing a roller with a crinkled surface over said lamina and producing in the outer plastic cementitious materials elevations and depressions resembling those of undressed stone, removing the non-adhering lamina and then forming in said outer plastic cementitious materials furrows or grooves of design and configuration in simulation of mortar joints on the surfaces of stone structures.

4. In a process of making an artificial stone facing, applying to a supporting base a layer of cementitious material in plastic form, then applying upon said layer at predetermined zones other cementitious material in plastic form and of a plurality of colors, covering the outer plastic material with a lamina of material to which the plastic material does not adhere, passing a roller with a crinkled surface over said lamina and producing in the outer plastic cementitious materials elevations and depressions resembling those of undressed stone, removing the non-adhering lamina, then forming in said outer plastic cementitious materials furrows or grooves of design and configuration in simulation of mortar joints on the surface of stone structures, and filling said grooves with cementitious material of contrasting color from the remainder of the facing.

5. In a process of making an artificial stone facing, applying to a supporting base a layer of cementitious material in plastic form, then troweling said layer at predetermined zones with other cementitious material in plastic form and of a plurality of colors, covering the outer plastic material with a lamina of material to which the plastic material does not adhere, passing a roller with a crinkled surface over said lamina and producing in the outer plastic cementitious materials elevations and depressions resembling those of undressed stone, removing the non-adhering lamina and then forming in said outer plastic cementitious material furrows or grooves of design and configuration in simulation of mortar joints on the surfaces of stone structures.

6. In a process of making an artificial stone facing, applying to a supporting base a layer of cementitious material in plastic form, scoring the surface of said cementitious material and allowing same to set and dry, applying thereon another layer of cementitious material in plastic form, then troweling said second layer at predetermined zones with other cementitious material in plastic form and of a plurality of colors, covering the outer plastic material with a lamina of material to which the plastic material does not adhere, passing a roller with a crinkled surface over said lamina and producing in the outer plastic cementitious materials elevations and depressions resembling those of undressed stone, removing the non-adhering lamina then forming in said outer plastic cementitious material furrows or grooves of design and configuration in simulation of mortar joints on the surfaces of stone structures, and filling said grooves with cementitious material of contrasting color from the remainder of the facing.

7. In a process of making an artificial stone facing, applying to a supporting base a layer of cementitious material in plastic form, then applying upon said layer at predetermined zones other cementitious material in plastic form and of a plurality of colors, covering the outer plastic material with a lamina of material to which the plastic material does not adhere, passing a tool over said lamina and producing in the outer plastic cementitious materials elevations and depressions resembling those of undressed stone, then forming in said outer plastic cementitious materials furrows or grooves of design and configuration in simulation of mortar joints on the surfaces of stone structures and removing the non-adhering lamina.

8. In a process of making an artificial stone facing, applying to a supporting base a layer of cementitious material in plastic form, then applying upon said layer at predetermined zones other cementitious material in plastic form and of a plurality of colors, covering the outer plastic material with thin waterproof paper, passing a roller with a crinkled surface over said paper and producing in the outer plastic cementitious materials elevations and depressions resembling those of undressed stone, then forming in said outer plastic cementitious materials furrows or grooves of design and configuration in simulation of mortar joints on the surfaces of stone structures and removing the waterproof paper.

LEWIS ALBERT KNIGHT.